May 3, 1927. 1,627,527
G. OBELE
STANCHION
Filed May 21, 1921 2 Sheets-Sheet 1
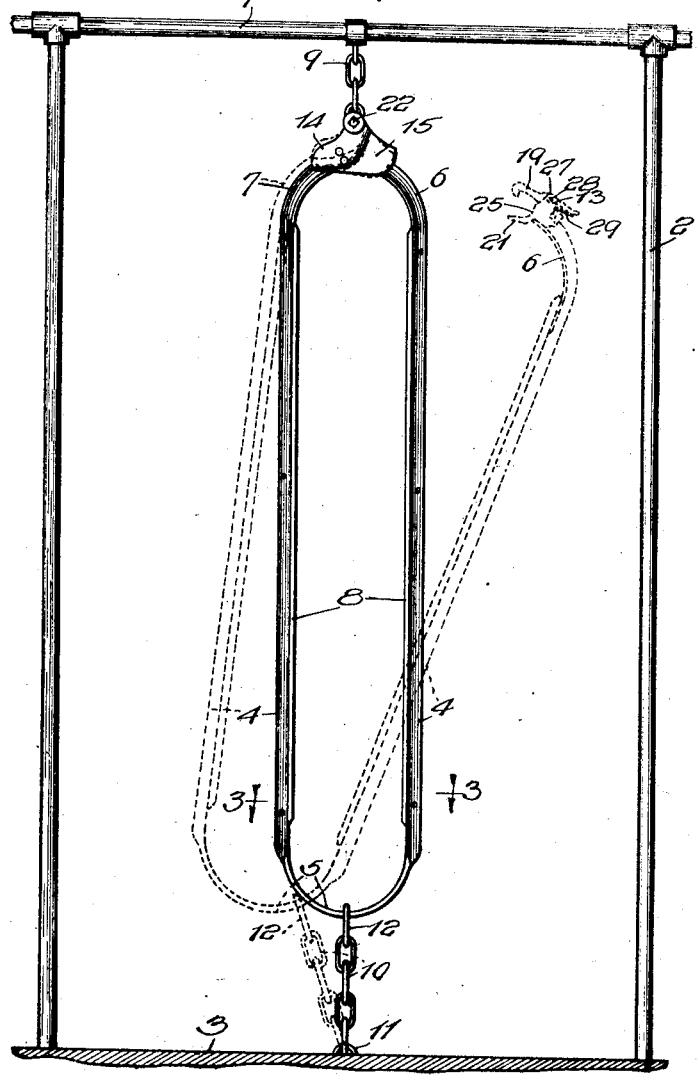
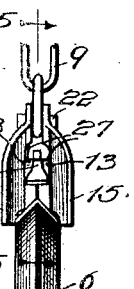
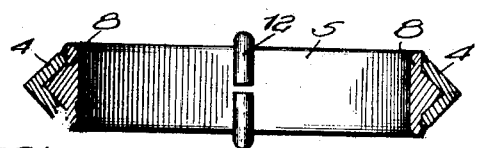
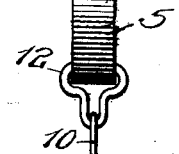
Witnesses:
W. F. Kilroy
Harry R. L. White
Inventor:
George Obele
By Kiee & Kiee Attys May 3, 1927.
G. OBELE
STANCHION
Filed May 21, 1921
1,627,527
2 Sheets-Sheet 2
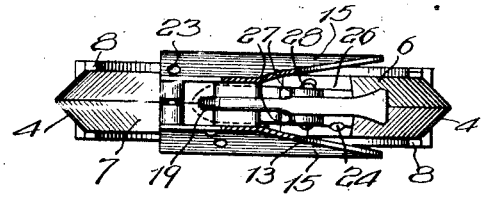
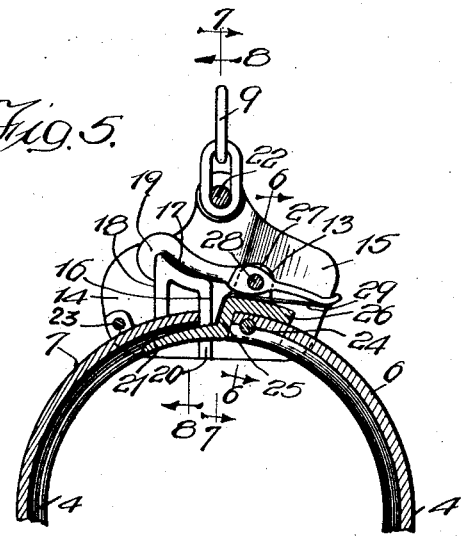
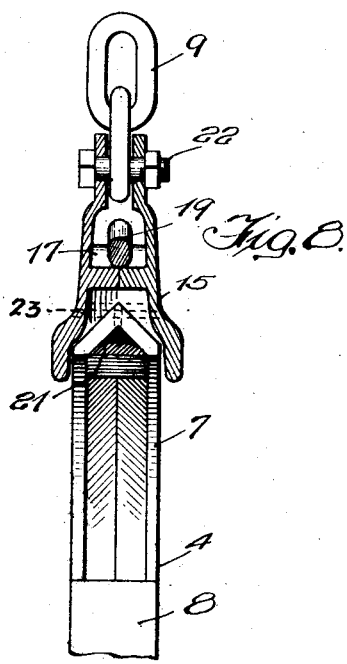
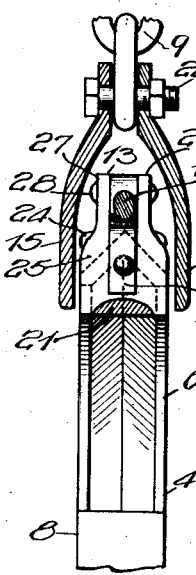
Inventor:
George Obele.

Patented May 3, 1927.

1,627,527

UNITED STATES PATENT OFFICE.

GEORGE OBELE, OF CEDAR FALLS, IOWA, ASSIGNOR TO CLAY EQUIPMENT CORPORATION, OF CEDAR FALLS, IOWA, A CORPORATION OF IOWA.

STANCHION.

Application filed May 21, 1921. Serial No. 471,336.

My invention relates to improvements in stanchions, and has among its other objects the production of a device of the kind described which is simple, convenient, compact, durable, economical, reliable, efficient and satisfactory for use wherever found applicable. Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts, Fig. 1 is an elevation of my device shown in use;

Fig. 2 is a side view of the device;

Fig. 3 is a section taken substantially on the line 3—3 of Fig. 1;

Fig. 4 is a top view of the device with parts of the latch guard broken away;

Fig. 5 is a section taken substantially on the line 5—5 of Fig. 2;

Fig. 6 is a section taken substantially on the line 6—6 of Fig. 5;

Fig. 7 is a section taken substantially on the line 7—7 of Fig. 5; and

Fig. 8 is a section taken substantially on the line 8—8 of Fig. 5.

In the drawings, wherein I have illustrated a preferred embodiment of my invention, 1 indicates the horizontal bars or supports for the stanchion, said horizontal supports being held in place by vertical bars or uprights 2 secured to the foundation or floor 3. The stanchion comprises a pair of spaced, preferably parallel, side bars or side arms 4, said side arms being of a suitable material, and preferably rigid. In the embodiment shown, I have formed the stanchion of an angle iron whose apex is intermediate the opposite sides of the bars 4 on the outer periphery of the stanchion. Connecting the lower ends of the bars 4, and spacing them apart to form substantially a U-shape, is the part 5, said part being formed integrally with the material of the bars 4 and being preferably resilient, that is, it tends to force the bars apart when they are in their latched or locked position. The lower end 5 is preferably formed by flattening out the legs of the angle iron at the lower ends of the side bars. In order not to chafe or injure the neck of the animal being held, liners 8, preferably of wood or other suitable material, are fitted within the side bars for substantially their entire length.

The stanchion is hung at its head, from the horizontals 1 by a chain 9 or any other suitable device which will permit of swiveling, the lower end of the stanchion being limited in its upward and lateral movement by anchor means 10 comprising the chain held to the floor 11 or the equivalent, the link 12 of the chain loosely encircling the bottom part 5 of the U-shaped stanchion, so that the stanchion may slide freely in said link 12. As there is no obstruction on the lower end of the stanchion, the stanchion will slide freely in the anchor, and as there are no cracks or crevices thereat, there will be a minimum of dirt or filth collecting at the lower end of the stanchion.

Secured to the upper or head ends 6 and 7 of the side bars, said ends being curved toward each other, are cooperating latch means 13 and 14 respectively, said part 14 being secured to the end 7 by rivets 23 or the like and comprising a pair of guards or ears 15, one on each side of the end 7 and extending downwardly and outwardly therefrom, there being a transverse web 16 between said guards 15 forming a shoulder for the abutting end 7 of the side bar 4, the upper surface of said web 17 being upwardly and rearwardly inclined and having a downturned web 18 parallel to the web 16 against which the head of the latch 19 engages in its locking position (see Fig. 7).

At the bottom of the web 16 is formed a recess or aperture 20 of substantially the same width as the groove in the side bars 4, in alignment therewith, and adapted to receive the tongue 21 of the cooperating latch part 13, A pin 22 is provided at the upper end of the member 14 between the guards 15, said pin being adapted to receive the supporting chain 9. Secured to the end 6 by rivets 24 or the like, the cooperating latch part 13 comprises a shoulder portion or abutment 25, engaging the free edge of the end 6, and an outwardly extending tongue 21 curved to fit within recess 20 and the groove in the end 7. The portion 25 is extended rearwardly over the end 6, and at its upper part has a pair of spaced ears 27, between which a latch member 19 is pivotally mounted on a pivot pin 28. A spring 29 or the like is secured to the parts 13, the free end of the spring pressing against the latch lever 19 to hold it in its downward latching position over the shoulder 18 of the part 14.

Thus it will be seen that I have provided a stanchion comprising a substantially U-shaped member having a resilient lower end, tending to space the rigid side arms apart, and when locked, this resiliency will even more securely hold the arms in their locked position. With this construction there is no lateral or transverse play at the top between the ends of the side arms or bars.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a stanchion, the combination of a pair of spaced side bars connected together at their lower ends, said bars made of angle iron metal having the meeting ridge exteriorly thereof, and latching means at the upper ends of said bars, and a tongue projecting from the upper end of one of the bars and in alignment with the groove formed by the legs of said angle iron, and a pair of guards extending from said grooved end, one on each side thereof, to guide said tongue into said groove.

2. In a stanchion, the combination of a pair of parallel, spaced side bars connected together at their lower ends, said bars made of angle iron metal having the meeting ridge exteriorly thereof, and forming a groove at the upper end of one of said bars, a pair of guards on the other of said bars extending from said end on opposite sides of said groove, detachable latching means between said ends, and a tongue projecting from the end of the other bar and in alignment with said groove, said guards adapted to enclose said latching means and guide said tongue into said groove.

In testimony whereof, I have hereunto signed my name.

GEORGE OBELE.